United States Patent
Liu et al.

(10) Patent No.: US 11,310,182 B2
(45) Date of Patent: Apr. 19, 2022

(54) GROUP COMMUNICATION ORGANIZATION

(71) Applicant: International Business Machines Corporation, Armonk, NY (US)

(72) Inventors: Su Liu, Austin, TX (US); Yang Liang, Beijing (CN); Arun Dev, Austin, TX (US); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 16/689,622

(22) Filed: Nov. 20, 2019

(65) Prior Publication Data

US 2021/0152506 A1 May 20, 2021

(51) Int. Cl.
*H04L 51/00* (2022.01)
*G06T 11/20* (2006.01)
*G06F 40/30* (2020.01)

(52) U.S. Cl.
CPC .............. *H04L 51/16* (2013.01); *G06F 40/30* (2020.01); *G06T 11/206* (2013.01)

(58) Field of Classification Search
CPC ......... H04L 51/16; H04L 51/00; H04L 51/04; H04L 51/32; G06F 40/30; G06F 3/0482; G06T 11/206; G06Q 10/107; G06Q 50/01; G06Q 10/10
USPC ....................................................... 709/206
See application file for complete search history.

(56) References Cited

U.S. PATENT DOCUMENTS

| | | | |
|---|---|---|---|
| 7,725,538 B2 | 5/2010 | Kirkland | |
| 7,904,515 B2 | 3/2011 | Ambati | |
| 8,190,999 B2 | 5/2012 | Chen | |
| 8,655,958 B2 | 2/2014 | Callanan | |
| 8,966,404 B2 | 2/2015 | Lee | |
| 9,602,886 B2 | 3/2017 | Amidei | |
| 10,021,059 B1 | 7/2018 | Rao | |
| 10,114,525 B2 | 10/2018 | Kim | |
| 10,218,657 B2 | 2/2019 | Cheung | |
| 10,268,340 B2 | 4/2019 | Chen | |
| 2008/0115068 A1 | 5/2008 | Smith | |
| 2010/0205544 A1 | 8/2010 | Brzeski | |
| 2014/0114895 A1 | 4/2014 | Beechum | |
| 2014/0143684 A1* | 5/2014 | Oh ....................... G06Q 10/107 715/752 |
| 2015/0256353 A1 | 9/2015 | Busey | |

(Continued)

OTHER PUBLICATIONS

Atapattu et al., "A Framework for Topic Generation and Labeling from MOOC Discussions," Third (2016) ACM Conference, Apr. 25-26, 2016, pp. 201-204.

(Continued)

*Primary Examiner* — Chris Parry
*Assistant Examiner* — Weiwei Y Stiltner
(74) *Attorney, Agent, or Firm* — Brian D. Welle (57) ABSTRACT

A text conversation between at least two users is monitored. A first regarding a first topic is detected. A second message received subsequent to the first message regarding a second topic is detected. A third message received subsequent to the second message regarding the first topic is detected. In response to detecting that the third message regards the first topic of the first message, the third message may be displayed immediately adjacent the first message.

18 Claims, 6 Drawing Sheets

(56) References Cited

U.S. PATENT DOCUMENTS

| | | | |
|---|---|---|---|
| 2016/0021052 A1* | 1/2016 | Bastide | H04L 51/32 |
| | | | 709/206 |
| 2016/0350675 A1* | 12/2016 | Laks | G06N 20/00 |
| 2016/0364368 A1* | 12/2016 | Chen | G06F 3/0482 |
| 2017/0068906 A1 | 3/2017 | Korycki | |
| 2017/0237692 A1 | 8/2017 | Sheth | |
| 2018/0025726 A1 | 1/2018 | Gatti De Bayser | |
| 2018/0060736 A1* | 3/2018 | Brewer | G06N 5/022 |
| 2018/0109475 A1 | 4/2018 | Griffin | |
| 2019/0020615 A1 | 1/2019 | Golden | |
| 2019/0089659 A1* | 3/2019 | Wang | H04L 51/16 |
| 2019/0155459 A1* | 5/2019 | Chen | G06F 3/0482 |
| 2020/0044996 A1* | 2/2020 | Johnson | H04L 51/046 |

OTHER PUBLICATIONS

Cheng et al., "Linked Topic and Interest Model for Web Forums," 2008 IEEE/WIC/ACM International Conference on Web Intelligence and Intelligent Agent Technology, Dec. 9-12, 2008, pp. 279-284.

Cui et al., "ONEChat: Enabling Group Chat and Messaging in Opportunistic Networks," Columbia University Computer Science Technical Reports, Jun. 6, 2011, 6 pages. <https://academiccommons.columbia.edu/doi/10.7916/D8H70PQS>.

Erickson et al., "A Persistent Chat Space for Work Groups: The Design, Evaluation and Deployment of Loops," Conference on Designing Interactive Systems 2006 (DIS 2006), Jun. 26-28, 2006, pp. 331-340.

Feng et al., "Learning to Detect Conversation Focus of Threaded Discussions," Proceedings of the main conference on Human Language Technology Conference of the North American Chapter of the Association of Computational Linguistics (HLT-NAACL '06), Jun. 4-9, 2006, 8 pages.

Geuze et al., "RE-phrase: Chat-By-Click," CHI 2008 Proceedings, Apr. 5-10, 2008, pp. 3345-3350.

Geyer et al., "Chat Spaces," Proceedings of the 5th Conference on Designing Interactive Systems: Processes, Practices, Methods, and Techniques (DIS '04), Aug. 1-4, 2004, pp. 333-336.

Harada et al., "Automatic Topic Extraction and Classification of Usenet Threads," Dept. of Computer Science, Stanford University, 2003, 8 pages. <https://nlp.stanford.edu/courses/cs224n/2003/fp/kshashi/project_khandelwal_harada.doc>.

Hsiao et al., "Topic Facet Modeling: Semantic Visual Analytics for Online Discussion Forums," Proceedings of the Fifth International Conference on Learning Analytics and Knowledge, Mar. 16-20, 2015, pp. 231-235.

Kerr et al., "Designing Remail: Reinventing the Email Client Through Innovation and Integration," CHI 2004, Apr. 24-29, 2004, pp. 837-852.

Li et al., "Using Annotations In Online Group Chats," Proceedings of the SIGCHI Conference on Human Factors in Computing Systems (CHI '14), Apr. 26-May 1, 2014, pp. 863-866. <https://scholar.harvard.edu/files/nalizhao/files/p863-li_0.pdf>.

Lin et al., "Modeling Semantics and Structure of Discussion Threads," Proceedings of the 18th International Conference on World Wide Web, Apr. 20-24, 2009, pp. 1102-1103. <http://wwwconference.org/www2009/proceedings/pdf/p1103.pdf>.

Mayfield et al., "Hierarchical Conversation Structure Prediction in Multi-Party Chat," Proceedings of the 13th Annual Meeting of the Special Interest Group on Discourse and Dialogue (SIGDIAL), Jul. 5-6, 2012, pp. 60-69.

Ramachandran et al., "Automated Chat Thread Analysis: Untangling the Web," Interservice/Industry Training, Simulation, and Education Conference (I/ITSEC), Paper No. 10159, Jan. 2010, 11 pages. <https://pdfs.semanticscholar.org/1f68/4cc2b00dc07760838ae83349879a854b2a2a.pdf>.

Ramachandran et al., "Untangling Topic Threads in Chat-Based Communication: A Case Study," Association for the Advancement of Artificial Intelligence, Papers from the 2011 AAAI Workshop (WS-11-05), Jan. 2011, pp. 50-55. <https://pdfs.semanticscholar.org/c45f/38db6c71be1972f0f9b65c2b1d02e3b15047.pdf>.

Ren et al., "Dynamically Modeling Semantic Dependencies in Web Forum Threads," 2011 IEEE/WIC/ACM International Conferences on Web Intelligence and Intelligent Agent Technology, Aug. 22-27, 2011, pp. 348-351.

Ren et al., "Summarizing Web Forum Threads based on a Latent Topic Propagation Process," Proceedings of the 20th ACM international Conference on Information and Knowledge Management, Oct. 24-28, 2011, pp. 879-884.

Russell, "Tencent reports $1.5B profit thanks to its WeChat messaging app and mobile games," TechCrunch, Nov. 16, 2016, 1 page. <https://techcrunch.com/2016/11/16/tencent-q3-2016/>.

Singh et al., "Retrieving Similar Discussion Forum Threads: A Structure Based Approach," Proceedings of the 35th International ACM SIGIR Conference on Research and Development in Information Retrieval (SIGIR'12), Aug. 12-16, 2012, pp. 135-144.

Smith et al., "Conversation Trees and Threaded Chats," Conference on Computer Supported Cooperative Work (CSCW'00), Dec. 2-6, 2000, pp. 97-105.

Tang et al., "Tag-it, Snag-it, or Bag-it: Combining Tags, Threads, and Folders in E-mail," CHI 2008 Proceedings, Apr. 5-10, 2008, pp. 2179-2194.

Vytasek et al., "Topic Models to Support Instructors in MOOC Forums," The Seventh International Learning Analytics & Knowledge Conference, Mar. 13-17, 2017, 2 pages.

Wanas et al., "Using automatic keyword extraction to detect off-topic posts in online discussion boards," Proceedings on the Content Analysis for the WEB 2 (CAW 2.0 2009), Apr. 21, 2009, 6 pages.

Xiao et al., "Unraveling the Ordering in Persistent Chat: A New Message Ordering Feature," Proceedings of the 2005 International ACM SIGGROUP Conference on Supporting Group Work (GROUP'05), Nov. 6-9, 2005, pp. 350-351.

Zhang et al., "Addressee and Response Selection in Multi-Party Conversations with Speaker Interaction RNNs," Association for the Advancement of Artificial Intelligence, Nov. 28, 2017, 9 pages. <https://arxiv.org/pdf/1709.04005.pdf>.

Zhang et al., "Making Sense of Group Chat through Collaborative Tagging and Summarization," Proceedings of the ACM on Human-Computer Interaction, vol. 2, Issue CSCW, Article 196, Nov. 2018, 27 pages. <https://people.csail.mit.edu/axz/papers/cscw_tilda.pdf>.

* cited by examiner

| Item | Group ID | Source | Topic ID | User ID | Content | Rule |
|---|---|---|---|---|---|---|
| 1 | group123 | App 112 | Eweek | A | "Anyone want to join the Ewe…" | New topic |
| 2 | group123 | App 112 | Eweek | B | "Me" | Time stamp |
| 3 | group123 | App 112 | Raking | C | "Our group needs three volu…" | New topic |
| 4 | group123 | App 112 | Raking | D | "Yeah, I need some voluntee…" | NLP match |
| 5 | group123 | App 112 | Eweek | E | "Always wanted to do that, c…" | Selection |
| 6 | group123 | App 112 | Raking | F | "I have a symposium that da…" | Context, Role |
| 7 | group123 | App 112 | Eweek | F | "Yeah, I'll sign up!" | Context, Role |
| 8 | group123 | App 112 | Picture | G | "By the way, I got this great…" | New topic |
| 9 | group123 | App 112 | Picture | F | "D looks hilarious in that!" | Context |
| 10 | group123 | App 112 | Eweek | G | "Yeah, I'll go to the Eweek a…" | Selection, Role |
| 10 | group123 | App 112 | Raking | G | "I can rake if I can miss my s…" | Selection, Role |
| 11 | group123 | App 112 | Picture | D | "Haha! Because of that pic y…" | Context, Role |
| 11 | group123 | App 112 | Raking | D | "Haha! Because of that pic y…" | Context, Role |
| 12 | group123 | Email | Raking | A | "Hey I can rake!" | Context |

GROUP COMMUNICATION ORGANIZATION

BACKGROUND

The number and complexity of communication programs and options is growing. Conventional communication programs often include a group of users discussing various topics within a single graphical user interface (GUI) window. The communication program may organize and display these messages in chronological order.

SUMMARY

Aspects of the present disclosure relate to a method, system, and computer program product relating to organizing messages of one or more group threads. For example, the method may include monitoring a text conversation between at least two users. The method may further include detecting a first message regarding a first topic. The method may further include detecting a second message received subsequent to the first message regarding a second topic. The method may further include detecting a third message received subsequent to the second message regarding the first topic. The method may further include displaying the third message immediately adjacent the first message in response to detecting that the third message regards the first topic of the first message. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing communication, while more particular aspects of the present disclosure relate to identifying elements of communication that indicate shared topics of messages in order to display relevant messages that regard a shared topic next to each other. While the present disclosure is not necessarily limited to such applications, various aspects of the disclosure may be appreciated through a discussion of various examples using this context.

Communication methods are becoming more numerous and complex. Increasingly, computing communication methods enable numerous users to participate within a single conversation, such as within a single graphical user interface (GUI) window. These multi-user conversations are conventionally displayed in chronological order, such that the most recently sent message is displayed on the top/bottom of the GUI window, with the previous messages being below/above this most recent message, respectively.

There may be substantially any number of users in one of these conversations. For example, there may be five, ten, twenty, a few dozen or more users within a single conversation. Further, these conversations may include any number of different topics that the users may be discussing. As such, these conversations may create a large mass of relatively unstructured data (e.g., such as a thread that includes a few hundred messages and/or takes place over the course of a few days or weeks or the like), such that users wanting to follow a particular topic thread may be forced to wade through a large number of irrelevant messages to understand the current sentiment of the thread. Further, when the conversation includes numerous topics (e.g., a first topic of whether users wanted to go to a restaurant and a second topic of whether users want to start on a new project") it may be difficult or impossible for conventional systems to differentiate (and therein for users of these conventional systems to differentiate) between different messages that are responsive to these different topics (e.g., it may be difficult for conventional system or a user thereof to differentiate between the restaurant topic and the new project topic in response to two messages of "yes, lets!" from a first user and "yeah I've been wanting to" from a second user). Adding to this, it may be difficult to filter out irrelevant topics from a group thread, and/or to get a clear order of events of replies (e.g., to see in what order people discussed a topic, when applicable).

Aspects of the disclosure may improve or solve these shortcomings. For example, aspects of this disclosure relate to identifying elements that indicate communication topics, and therein using these identifying elements to enable a user to identify all messages of a single topic and/or display conversation threads about a single topic adjacent each other. A computing system that includes a processor that executes instructions stored on a memory (this computing system hereinafter referred to as a controller) may identify these elements and therein identify messages of a single topic. This controller may be integrated into and/or otherwise control some functionality of one or more of the communication applications described herein. The controller may detect a plurality of different types of situations, and, in response to these detected situations, provide different language modifications.

The controller may be configured to detect that messages are related to a topic by analyzing one or more elements of the messages. For example, the controller may analyze the meaning of the content of the messages through one or more natural language processing (NLP) techniques as described herein, such as when two messages discuss the same subject matter. For another example, the controller may identify that time stamps of the relevant messages indicate that the messages are related, such as when the relevant messages are the first two of a thread and the second message is responsive in nature. For another example, the controller may identify that messages are related to a single topic by analyzing traits of the users, such as a role of a user or a calendar of a user or the like to identify which topic the message of the user may be referring to. In some examples, the controller may do an analysis of many of these elements to determine which topic a message relates to. In certain examples, the controller may enable users to provide annotations that functionally self-select one or more topics of the conversation. In this way, aspects of the disclosure may be configured to improve an ability of a computing system to detect which of a plurality of topics of a conversation that an individual message of that conversation is related to, and therein display messages of a single topic adjacent each other in response to a prompt from a user.

Figure 1A:
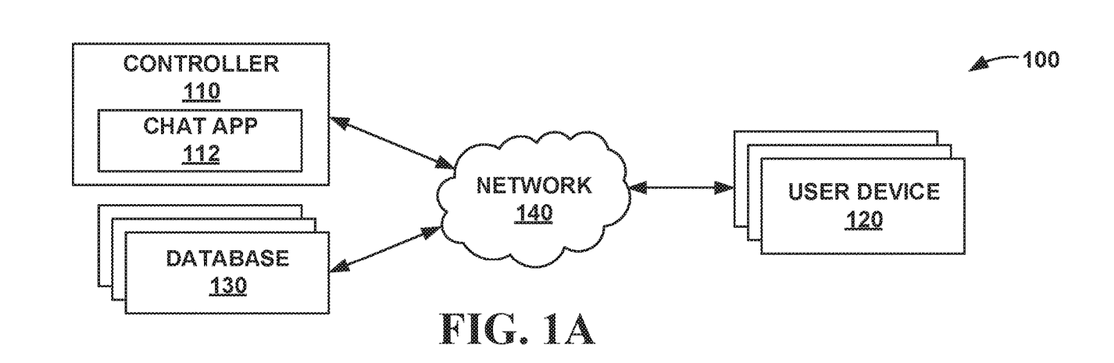
FIG. 1A depicts a conceptual diagram of an example system in which a controller may manage communication between a plurality of users.

For example, FIG. 1A depicts system 100 in which controller 110 manages communication between a plurality of users. Controller 110 may include a computing device, such as computing device 200 of FIG. 2 that includes a processor communicatively coupled to a memory that includes instructions that, when executed by the processor, causes controller 110 to execute one or more operations described below. Controller 110 may manage communication between users as sent from a plurality of user devices 120. User devices 120 may include computing devices (e.g., devices similar to computing device 200 of FIG. 2) such as desktop computers, laptops, mobile phones, tablets, or the like.

Users may communicate on user devices 120 via one or more chatting applications 112 (shortened to chat app 112 on FIG. 1A for purposes of illustration). Chatting applications 112 may include interfaces over which a plurality of users may communicate, such as via messages that include text. Messages sent from one user device 120 to other user devices 120 over chatting application 112 may be immediately presented to other user devices 120 via a GUI window displayed on respective user devices 120 into which all messages are displayed. Chatting applications 112 is depicted in FIG. 1A as hosted on controller 110 (and therein accessed by respective user devices 120) for purposes of illustration. However, it is to be understood that in other examples respective instances of chatting applications 112 may be downloaded onto user devices 120 which further download some or all functionality of controller 110 as a plugin. In these examples, controller 110 may manage communication as discussed here for each local instance of chatting application 112. Other examples of relative locations of controller 110 and/or chatting application 112 within system 100 that are consistent with this disclosure are also contemplated.

User devices 120 may access each other and chatting applications 112 over network 140. Network 140 may include a computing network over which computing messages may be sent and/or received. For example, network 140 may include the Internet, a local area network (LAN), a wide area network (WAN), a wireless network such as a wireless LAN (WLAN), or the like. Network 140 may comprise copper transmission cables, optical transmission fibers, wireless transmission, routers, firewalls, switches, gateway computers and/or edge servers. A network adapter card or network interface in each computing/processing device (e.g., controller 110, user devices 120, and or databases 130) may receive messages and/or instructions from and/or through network 140 and forward the messages and/or instructions for storage or execution or the like to a respective memory or processor of the respective computing/processing device. Though network 140 is depicted as a single entity in FIG. 1A for purposes of illustration, in other examples network 140 may include a plurality of private and/or public networks over which controller 110 may monitor conversations.

Figure 1B:
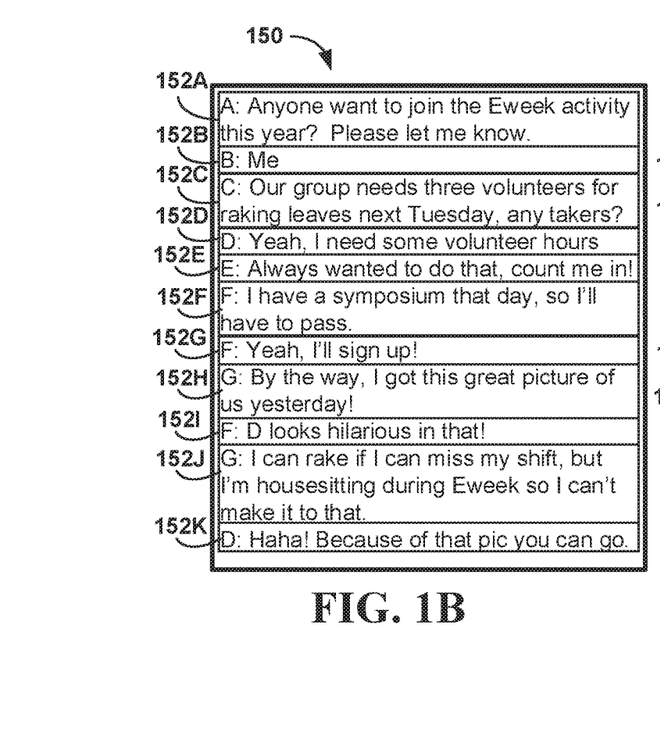
FIG. 1B depicts example communication between a plurality of users.

For example, controller 110 may monitor conversation 150 of FIG. 1B. Conversation 150 as depicted in FIG. 1B includes a plurality of messages 152A-152K (collectively, "messages 152,", though as discussed herein message 152L (discussed below) is to be understood as included within messages 152). All messages 152 within conversation 150 may be from a single chatting application 112. Messages 152 come from a plurality of users (these users being A, B, C, D, E, F, and G as indicated at the beginning of messages 152 within conversation 150) that are each communicating from respective user devices 120.

As discussed above, prior to communication management of controller 110 it may have been difficult or impossible for chatting applications (and therein users utilizing these chatting applications) to identify the topic (and therein meaning) of some of messages 152. For example, it may be difficult or impossible for users A and C to know which topic (e.g., Eweek or raking) user E was referring to with message 152D, "Always wanted to do that, count me in!" given as the plain meaning of this message could refer to either topic.

Accordingly, controller 110 analyzes messages 152 to identify topics of messages 152. Controller 110 may utilize NLP techniques as described herein to identify three topics of conversation 150, those three topics being Eweek, volunteer raking, and the picture of user D. Controller 110 may subsequently match messages 152 to one of these topics.

Controller 110 may match messages 152 to a topic via a timestamp associated with messages 152. For example, being as message 152B was received and therein has a timestamp when only one topic was established (via message 152A) in conversation 150, controller 110 may therein identify that message 152B regards the Eweek topic. Timestamps as discussed herein may be timestamps of when messages 152 are received by respective user devices 120, such that some of each user device 120 may identify different time stamps for each message 152 (e.g., where chat app 112 is stored locally on each user device 120). Alternatively, or additionally, timestamps may be timestamps of when messages 152 are received by a centrally hosted chat app 112. Further, in some examples timestamps may reflect when messages 152 were sent by respective user devices 120 (and/or an average or combination of each type of timestamp described herein). In some examples, controller 110 may utilize a timestamp of, e.g., message 152B to associate it with a topic even though numerous topics existed when message 152B was received. For example, controller 110 may detect that message 152B was received 0.001 seconds after message 152C was received, and being as 0.001 is less than a responsive threshold (e.g., a threshold of 0.1 seconds) it is unlikely that user B would have responded to message 152C from user C within this time. In such examples, controller 110 may utilize a timestamp of message 152B to identify that message 152 related to a topic of message 152A, even though (in this example) message 152B came after message 152C (e.g., such that conversation 150 included two topics when message 152C was received) and the subject matter of message 152B was responsive to the topics of both message 152A and message 152C.

Controller 110 may also utilize NLP techniques to match the content of messages 152 to topics. For example, controller 110 may utilize NLP techniques to identify that the content of message 152D ("Yeah, I need some volunteer hours") matches the topic of message 152C (volunteer raking).

Controller 110 may further identify a topic of messages 152 via identifying annotations. For example, controller 110 may provide a means by which users may select messages 152 that their own messages 152 refer to. Where controller 110 identifies such an identifying annotation, controller 110 may default to using this identifying annotation even if other topic identifying "rules" as discussed herein (e.g., timestamp, content, or role as described below) indicate different topics.

Controller 110 may further identify topics of messages 152 via one or more traits of users. For example, controller 110 may reference a schedule of users, an organizational role of users, or the like to identify a topic of messages 152. For example, in analyzing message 152F, controller 110 may check a schedule of the user F and identify that user F has a symposium that is scheduled to conflict with raking leaves (e.g., such that user F has a symposium scheduled for next Tuesday) but does not have a symposium scheduled for Eweek. Controller 110 may further bolster this association by identifying that the Eweek event is for a full week, whereas the context of message 152F (as identified by NLP techniques) only indicated unavailability for a single day. In some examples, controller 110 may gather this trait data (e.g., a role of a user, or a calendar of a user, or the like) directly from messages 152. In other examples, controller 110 may gather this data from one or more databases 130 over network 140. For example, databases 130 may include data on one or more users, such as roles within an organization or calendars of users or the like.

Controller 110 may also cross reference messages 152 to identify topics of messages 152. For example, though message 152G may, by itself (e.g., as analyzed by NLP techniques), be difficult or impossible to identify as relating to a single topic, controller 110 may be configured to identify that user F already ruled themselves out of one of the two events (raking), such that message 152G must relate to the other topic (Eweek). In such ways, controller 110 may be configured to determine a correlation of respective messages 152 to all topics using a variety of elements.

In some examples, controller 110 may identify that some messages 152 relate to multiple topics. For example, controller 110 may identify that the subject matter of message 152J relates to both the Eweek topic and the volunteer raking topic. Controller 110 may identify this by analyzing the subject matter of message 152J using NLP techniques (e.g., being as message 152J discusses both rak[ing] and Eweek) and/or by a selection/annotation of user G.

Further, controller 110 may analyze message 152K to identify that it relates to two topics. For example, first controller 110 may use NLP techniques to identify that message 152K included laughter, which was only an appropriate response to the "picture" topic, such that message 152K relates to this topic. Beyond this, controller 110 may identify that the content of the rest of message 152K ("because of that pic you can go") does not correlate to the "picture" topic. In response to this determination, controller 110 may analyze traits of user D, and identify that user D is a shift manager of user G, such that message 152K was user D responding to a previous portion of message 152J from user G that related to raking, such that message 152K also relates to topic "raking." In this way, controller 110 may execute multi-element correlation analysis for one or more messages 152 to identify which messages 152 relate to which topics.

Figure 1C:
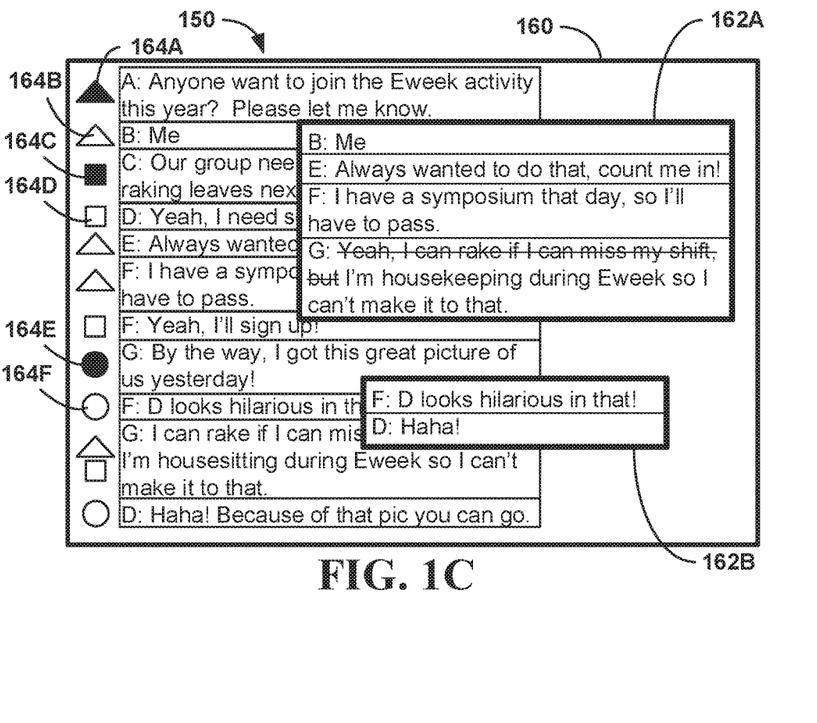
FIG. 1C depicts the example communication of FIG. 1B as managed by the controller of FIG. 1A.

Once controller 110 identifies topics of messages 152, controller 110 may display related messages 152 of conversation 150 immediately adjacent each other within a GUI window 160 as depicted in FIG. 1C. As used herein, messages 152 (e.g., such as related messages 152 which include messages 152 that all relate to a single topic) are immediately adjacent each other when these messages 152 are spatially adjacent each other without other messages 152 (e.g., other messages 152 meaning unrelated messages 152) being arranged spatially between them (as displayed by controller 110).

As depicted in FIG. 1C, controller 110 may display related messages 152 adjacent each other via pop-up windows 162A, 162B (collectively, "pop-up windows 162). In other examples, controller 110 may display related messages 152 adjacent each other via other means (e.g., such as by rearranging messages 152 within conversation 150) that are consistent with this disclosure. Controller 110 may display related messages 152 adjacent each other in response to an affirmative command or prompt from one or more users. For example, user A may later be unsure as to which users would like to join the Eweek activity, such that user A asks controller 110 to display messages (152B, 152E, 152F, 152J) that relate to the Eweek topic, in response to which controller 110 causes a display to present pop-up window 162A or the like.

As depicted, controller 110 may be configured to indicate portions of messages 152 that are related to the selected topic, where messages 152 relate to multiple topics. For example, as discuss above message 152J relates to both the raking topic and the Eweek topic. As such, when displaying message 152J adjacent the Eweek topic, controller 110 indicates the portion of message 152J that relates to Eweek normally, while striking out the portion of message 152J that relates to raking. Other manners of indicating a single portion of a message (e.g., highlighting, bolding, underlining, italicizing, only including one portion) are also contemplated herein.

Controller 110 may also depict identifying annotations 164A-164F (collectively, "identifying annotations 164") adjacent messages 152 of conversation 150 within window 160. Identifying annotations 164 may indicate the topic that respective messages 152 are associated with. As discussed above, users may provide identifying annotations 164 themselves by affirmatively indicating which message 152 and/or topic they are responding to. Users may provide these identifying annotations 164 using user devices 120 by, e.g., clicking on the respective message(s) 152 that they are responding to. In some examples, identifying annotations 164 may exclusively be placed by users, such that controller 110 is not configured to autonomously provide identifying annotations 164. As described herein, where a user self-selects a topic that their message 152 relates to, controller 110 may be configured to auto-identify this message 152 as related to this topic, substantially regardless of other factors. In other examples, controller 110 may itself provide (within window 160) some or all identifying annotations 164 (even if a user never self-selects) after identifying that respective messages 152 are related to respective topics.

As depicted in FIG. 1C, identifying annotations 164 may be different for different topics. For example, as depicted, messages 152A, 152B, 152E, 152F, 152J that are related to the Eweek topic are associated with triangular identifying annotations 164A, 164B, while messages 152C, 152D, 152H, 152J that are related to the raking topic are associated with square identifying annotations 164C, 164D, and messages 152H, 152I, 152K associated with the picture topic are associated with circular identifying annotations 164E, 164F. Further, as depicted, controller 110 may display identifying annotations 164 such that messages 152 that instantiate topics are associated with different identifying annotations 164 than messages 152 that respond to topics. For example, as depicted identifying annotations 164A, 164C, 164E are "filled" shapes and relate to messages 152A, 152C, 152H that instantiate topics, while identifying annotations 164B, 164D, 164F are "hollow" shapes and relate to messages 152B, 152D, 152E, 152F, 152G, 152I, 152J, 152K that respond to these topics.

Figure 2:
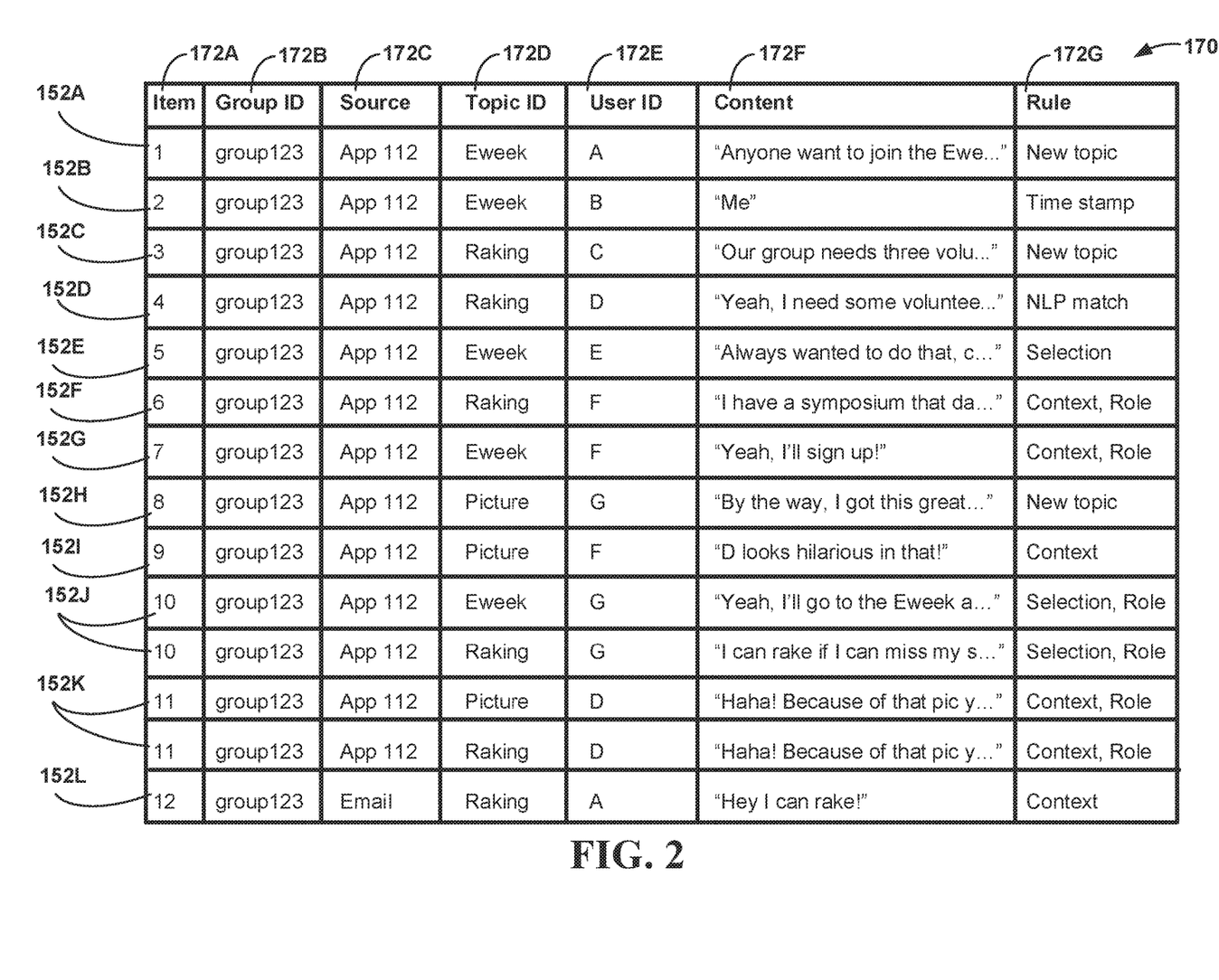
FIG. 2 depicts an example chart of communication elements of the communication of FIG. 1B as utilized by the controller of FIG. 1A.

In some examples, controller 110 may further create a chart that captures some or all of this data at once. For example, FIG. 2 depicts chart 170 of conversation 150 that relates to all messages 152 (including new message 152L, discussed below). Chart 170 includes a series of elements 172A-172G (collectively, "elements 172") that collectively define much of conversation 150. Elements 172 of chart 170 as depicted in FIG. 2 are for purposes of example only, as in other embodiments controller 110 may include more or less or different elements 172.

As depicted in FIG. 2, controller 110 creates chart 170 to include item element 172A (which indicates different messages 152 indicators), group element 172B (that indicates the full set of users), the source element 172C (that indicates where conversation 150 messages 152 originated from), topic elements 172D (the topic as identified by controller 110), the user. As depicted in chart 170, if messages 152 relate to different topics controller 110 may cause chart 170 to have separate lines/entries for the two different topics (e.g., as depicted with regards to messages 152J, 152K). In this way, a user may view chart and click on substantially any portion of chart 170 to be brought to the relevant message(s) 152, topics, or the like.

In some examples, controller 110 may be configured to identify that messages 152 are related even if these messages 152 occur across different communication methods. For example, as discussed above, controller 110 may monitor and analyze messages 152A-152K on one chatting application 112, for which controller 110 is a plugin or otherwise has access to analyze data. Controller 110 may further be configured to analyze communication across one or more other chatting applications 112, which may include email exchanges, text messages, or the like. As part of this, controller 110 may be configured to identify messages 152 from other chatting applications 112 as related to conversation 150. For example, controller 110 may identify an email message 152L from user A to user D with the content "Hey I can rake!" as related to the raking topic. In response to this, controller 110 may include this message 152L in chart 170 for this conversation 150. Further, in some examples controller 110 may be configured to include this message 152L in one or more relevant pop-up windows 164 or the like to display related messages 152 adjacent other messages 152.

Figure 3:
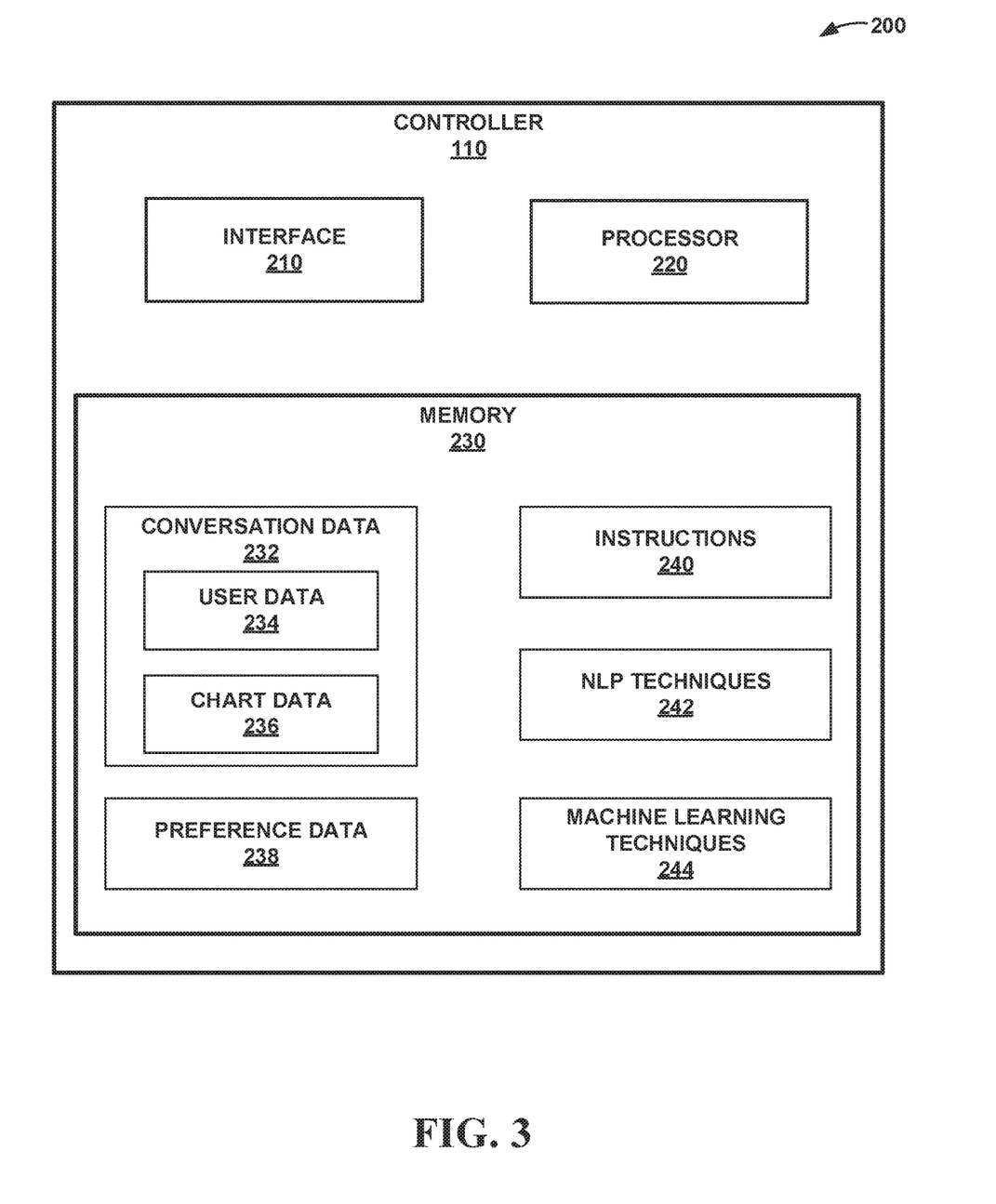
FIG. 3 depicts a conceptual box diagram of example components of the controller of FIG. 1A.

As described above, controller 110 may include computing device 200 with a processor configured to execute instructions stored on a memory to execute the techniques described herein. For example, FIG. 3 is a conceptual box diagram of such computing device 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interfaces 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with user devices 120, database 130, or the like. Interface 210 may include one or more network interface cards, such as Ethernet cards, and/or any other types of interface devices that can send and receive information. Any suitable number of interfaces may be used to perform the described functions according to particular needs.

As discussed herein, controller 110 may be configured to manage communication by identifying messages of a conversation thread that are related and further display those messages adjacent each other when prompted by a user. Controller 110 may utilize processor 220 to thusly manage communication. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to manage communication accordingly.

Processor 220 may manage communication according to instructions 240 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may manage communication as described herein according to instructions 240 of one or more applications (e.g., software applications) stored in memory 230 of controller 110.

In addition to instructions 240, in some examples gathered or predetermined data or techniques or the like as used by processor 220 to manage communication as described herein may be stored within memory 230. For example, memory 230 may include information described above that may be stored in database 130, and/or may memory 230 may include substantially all of database 130. For example, as depicted in FIG. 3, memory 230 may include conversation data 232, which includes user data 234 and chart data 236. Conversation data 232 may include each message of a conversation, including the full text of the messages and any timestamps associated with these messages. Conversation data 232 may further include identifying annotations as provided by a user or the like. Conversation data 232 may also include user data 234 as identified by controller 110. This may include a role of users, calendar data, or the like. Further, conversation data 232 may include chart data 236, which may include data similar to chart 170, including elements 172 as discussed herein.

Further, memory 230 may include preference data 238. Preference data 238 may include preferences for how to display data and/or how to gather user data 234. For example, preference data 238 may include preferences for one or more users on how to display immediately adjacent messages 152 (e.g., via a pop-up window 164, and/or by rearranging messages 152 of a conversation 150). Further, preference data 238 may include data on what data user approves controller 110 to gather, such as calendar data or the like.

In some examples, preference data 238 may include preference as to how controller 110 may match messages 152 to topics. Specifically, preference data 238 may store a preference as to whether or not controller 110 utilizes timestamps, annotations, user calendars, use roles, NLP techniques, or the like in matching messages 152. For example, users may save within preference data 238 that controller 110 is not to reference time stamp data in matching messages 152 to topics. Additionally, or alternatively, users may store within preference data 238 an order with which controller 110 may consider different factors (e.g., changing a rule engine that factors which rules are considered in matching messages 152 to topics). For example, as discussed herein controller 110 may utilize a user-provided identifying annotation 164 when these are available, even disregarding timestamp data and/or context data or the like to match messages 152 that have user-provided identifying annotations 164 to topics. However, a user may change this within preference data 238, such that annotations 164 are considered as a lesser correlation or are not considered at all or the like.

Memory 230 may further include NLP techniques 242. NLP techniques 242 can include, but are not limited to, semantic similarity, syntactic analysis, and ontological matching. For example, in some embodiments, processor 220 may be configured to parse messages 152 from conversations 150 to determine semantic features (e.g., word meanings, repeated words, keywords, etc.) and/or syntactic features (e.g., word structure, location of semantic features in headings, title, etc.) of these messages 152. Ontological matching could be used to map semantic and/or syntactic features to a particular concept. The concept can then be used to determine the topic of each of messages 152. In this way, using NLP techniques 242, controller 110 may, e.g., identify a context of a given message 152 to therein match this message 152 to a given topic.

Memory 230 may further include machine learning techniques 244 that controller 110 may use to improve a process of managing communication as discussed herein over time. Machine learning techniques 244 can comprise algorithms or models that are generated by performing supervised, unsupervised, or semi-supervised training on a dataset, and subsequently applying the generated algorithm or model to manage communication.

Machine learning techniques 244 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, machine learning techniques 244 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 4:
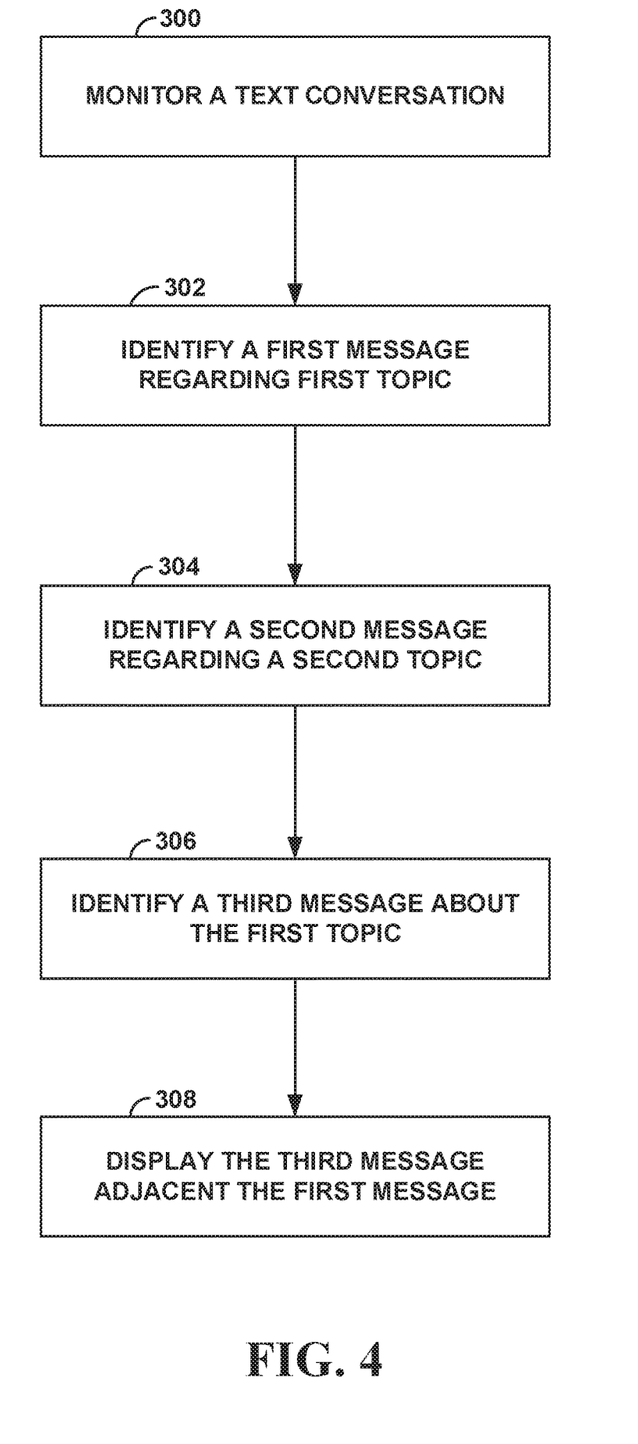
FIG. 4 depicts an example flowchart by which the controller of FIG. 1A may manage the communication between a plurality of users.

Using these components, controller 110 may detect messages that are related to the same topic (and therein display these messages adjacent each other) as discussed herein. For example, controller 110 may detect related messages and display them adjacent each other according to the flowchart depicted in FIG. 4. The flowchart of FIG. 4 is discussed with relation to FIGS. 1A-1C for purposes of illustration, though it is to be understood that other systems and message may be used to execute the flowchart of FIG. 4 in other examples. Further, in some examples controller 110 may execute a different method than the flowchart of FIG. 4, or controller 110 may execute a similar method with more or less steps in a different order, or the like.

As depicted in FIG. 4, controller 110 may monitor text conversation 150 of users (300). There may be any number of users using any number of user devices 120 within text conversation 150. For example, as depicted in conversation 150 of FIG. 1B, controller 110 may monitor messages 152A-152K as sent by user devices 120 across network 140 via chatting application 112.

Controller 110 may identify first message 152A received at a first time regards a first topic (302). For example, controller 110 may identify that first message 152A regards the topic "Eweek." Controller 110 may utilize NLP techniques as described herein to identify the topic of message 152A.

Controller 110 may subsequently identify another message 152C that relates to a second topic (304). For example, controller 110 may identify message 152C that regards "raking," as identified using NLP techniques as described herein. Controller 110 may determine that this message 152C was received at a second time that was subsequent to a time at which message 152A was received. For example, controller 110 may verify timestamps of both messages 152 to determine that message 152C was received later than message 152A.

Controller 110 may detect another new message that relates to the first topic (306). For example, controller 110 may detect message 152E that regards the topic (Eweek) of message 152A. Message 152E may be received at a time that is subsequent to message 152C. In response to detecting that third message relates to a topic of the first message, controller displays third message adjacent first message (308). For example, controller 110 may provide pop-up window 164A that depicts message 152E adjacent message 152A.

Figure 5A:
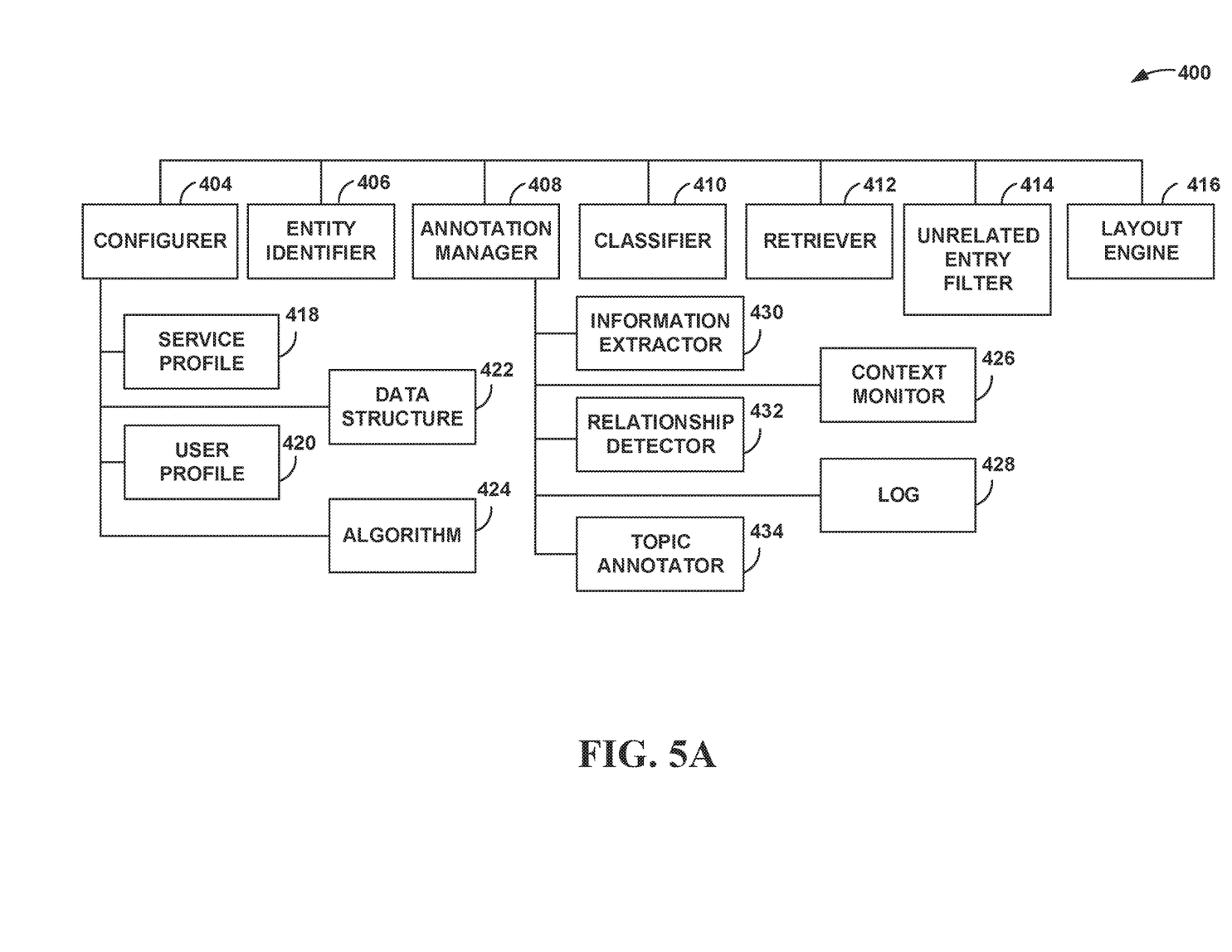
FIGS. 5A and 5B depict a conceptual box diagram of another example system for managing communication, and a flowchart for how information may flow through this system when managing a conversation of messages for a chatting group of users, respectively.
Figure 5B:
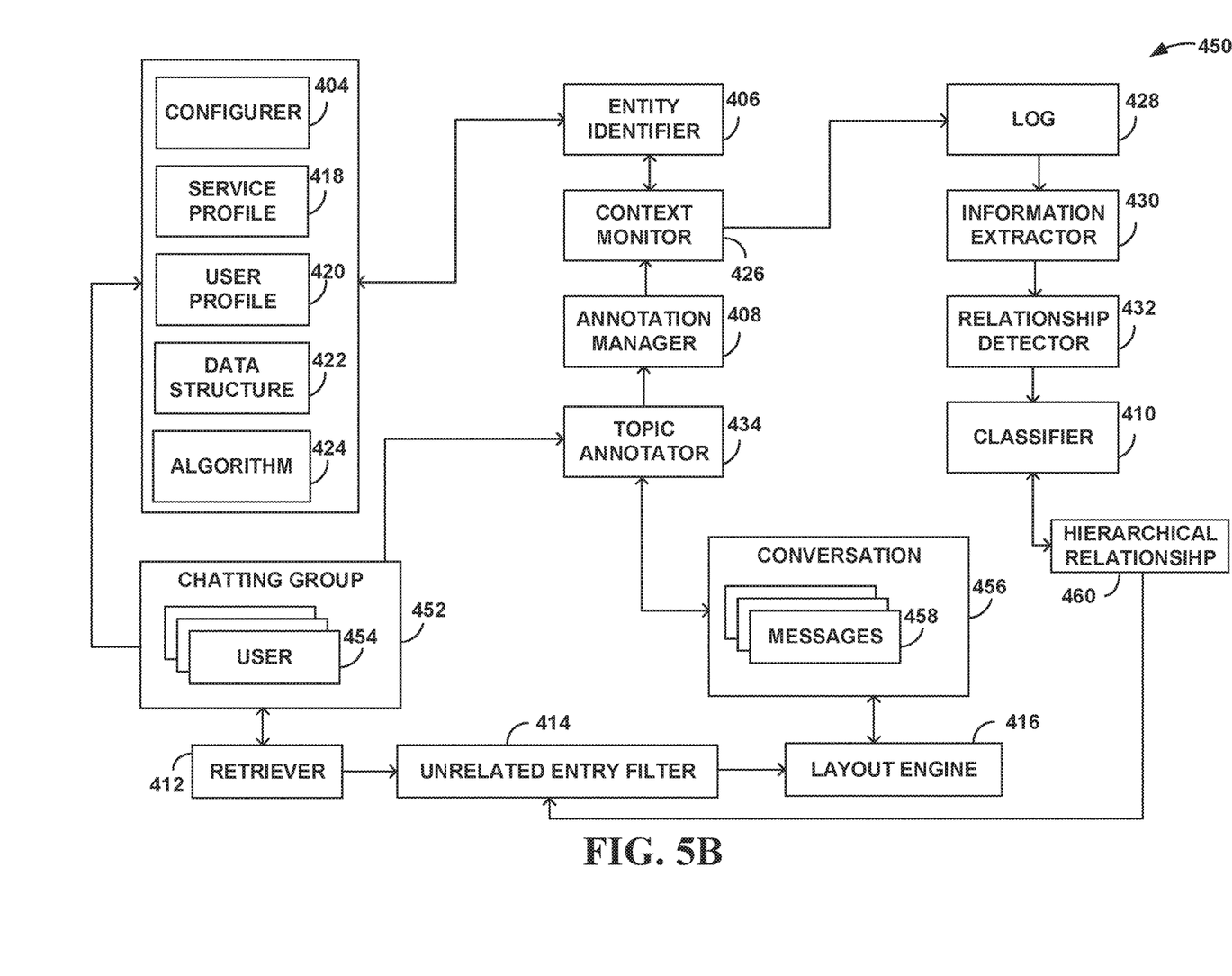

FIGS. 5A and 5B depict a conceptual box diagram of another example system for managing communication (specifically a cognitive hierarchical chatting message layout (CHCML) engine 400), and flowchart 450 for how information may flow through this CHCML engine 400 when managing 456 conversation of messages 458 for chatting group 452 of users 454, respectively. CHCML engine 400 may be included in controller 110. For example, some or all of CHCML engine 400 may be stored within instructions 240 of memory 230 of controller 110.

As described above, CHCML engine 400 may include criteria, rules, and/or factors for intelligently managing a chatting session from one or more chatting applications 112. CHCML engine 400 may be configured to define a data structure for monitoring, annotating, classifying, retrieving data for, filtering, grouping, and/or providing different layouts for multiple topics, conversation threads, and/or users. CHCML engine 400 is configured to identify user names and user roles, and to enable users to annotate new entries within an ongoing conversation thread, monitor this ongoing thread, view current users, topics, and chatting threads, detect a hierarchical relationship of corresponding conversation threads, and therein annotate any further messages that are not yet annotated. CHCML engine 400 can then classify chatting threads based on these annotated messages, retrieve messages or threads in response to prompts from users, display related messages adjacent each other (and therein filter out unrelated messages), or the like.

CHCML engine 400 may include a plurality of modules, such as configurer module 404, entity identifier module 406, annotation manager module 408, classifier module 410, retriever module 412, unrelated entry filter module 414, layout engine module 416, service profile module 418, user profile module 420, data structure module 422, algorithm module 424, information extractor module 430, context monitor module 426, log module 428, relationship detector module 432, and topic annotator module 434. In other examples CHCML engine 400 may have more or less modules, or similar modules with different functionality, or the like.

Configurer module 404 may be configured to configure and set real-time cognitive hierarchical chatting message layout. Configurer module 404 may include or otherwise utilize service profile module 418, user profile module 420, data structure module 422, and algorithm module 424. Service profile module 418 may be configured to create and/or store service profiles, which are configuration files for saving basic and/or default service controls. Settings may include annotation rules (that enable users to mark a parent entry before providing their own answer), filtering rules (that enable users to filter out some messages), layout rules (that highlight related child entries, display structures from parent messages to child messages), and/or question-answer threads and logic thereof (such as distance rules, time rules, context rules, or the like).

User profile module 420 may be configured to create and/or store user profiles. User profiles may include a configuration file for saving personal characteristics of users (e.g., such as a role as described herein) and/or user preferences. User profiles may also include information relating to user relationships, such as whether any users have or share job histories, education, social media connections, or the like.

Data structure module 422 includes a data structure (e.g., such as a list or array) for defining and storing threads and messages, such as post identifications (IDs) (e.g., 172A of FIG. 2), topic IDs (e.g., 172D of FIG. 2), user IDs (e.g., 172E of FIG. 2), relationship IDs (e.g., 172G of FIG. 2), group IDs (e.g., 172B of FIG. 2), or the like. For example, data structure module 422 may store data with a structure of group>conversation>topic>user>messages (where data of a conversation is stored as a subset of the group, and data of a topic is stored as a subset of the conversation, and the like). Other structures are also possible.

Algorithm module 424 may be configured to determine a hierarchical location of messages within a conversation. For example, algorithm module 424 may analyze multiple rules and elements for determining such a level, including a relationship between users, a "distance" (e.g., as measured in time or as measured as a number of messages between) two messages, or the like. Algorithm module 424 may consider identifying annotations 164 (e.g., such that algorithm module 424 may be configured to have annotations 164 override other considerations), subject matter context (as identified using NLP techniques), a time stamp, user relationships, or a combination of some or all of these.

CHCML engine 400 includes entry identifier module 406 may be configured to identify contextual information of the conversation. Contextual information may include the relevant users, their names, relevant event names, dates, location, or the like. CHCML engine 400 also includes annotation manager module 408, which is configured to annotate messages and therein determine a hierarchical relationship according to algorithm module 424. Annotation module 408 includes or otherwise utilizes context monitor module 426, log module 428, information extractor module 430, relationship detector module 432, and topic annotator module 434.

Information extractor module 430 may be configured to identify users, topics, threads, or the like from a conversation to be saved and/or utilized by data structure module 422. Context monitor module 426 may be configured to monitor threads for new messages for analysis. Log module 428 is configured to log all data for future reference, such that decisions of annotation manager module 408 (and/or of CHCML engine 400) may be later referenced as necessary. Relationship detector module 432 is configured to determine a relationship of threads according to configure module 404. Put differently, relationship detector module 432 may utilize configurer module 404 (and all sub-modules of configurer module 404) to determine relationships between threads of the conversation. Topic annotator module 434 is configured to annotate unannotated messages according to other rules of CHCML engine 400 (e.g., such as with a time stamp rule, or a content rule, or the like).

Classifier module 410 of CHCML engine 400 is configured to classify some or all threads based on the identified chatting relationship (e.g., identify a thread as a thread, and title it appropriately). Retriever module 412 is configured to retrieve messages that belong to a related thread based on a prompt of a user. For example, retriever module 412 may identify that a user requested to see all messages from a certain user for a certain topic on a certain thread, and may accordingly retrieve each of these threads for presentation.

Unrelated entry filter module 414 may be configured to filter (e.g., remove from a display) some or all messages that are not related to one or more selected topics. Unrelated entry filter module 414 may filter away messages in response to a request from retriever module 412 to only display messages of a selected topic or the like. Layout engine module 416 may be configured to display related messages to the user adjacent each other. For example, layout engine module 416 may be configured to present pop-up windows 162 discussed above. Layout engine module 416 may be configured to provide this information in a real-time fashion in response to prompts from users, doing so in a user-friendly manner. Layout engine module 416 may be highly customizable, such that a user may select, e.g., whether pop-up windows 162 are preferred, where the pop-up windows 162 would be displayed, or the like.

As discussed above, FIG. 5B depicts flowchart 450 of data through CHCML engine 400 modules 404-434 as CHCML engine 400 analyzes conversation 456 with a plurality of messages 458 for chatting group 452 with a plurality of users 454. CHCML engine 400 may manage the communication of conversation 456 between users 454 as discussed above to determine and display hierarchical relationships 460 as discussed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    identifying that a first message of a text conversation displayed within a graphical user interface (GUI) window between at least two users regards a first topic;
    identifying that a second message received subsequent to the first message and of the text conversation regards a second topic;
    identifying that a third message received subsequent to the second message and of the text conversation includes a first portion that regards the first topic and a second portion that regards the second topic;
    displaying respective identifying annotations that are non-textual symbols that indicate respective topics of respective messages adjacent each message of the conversation such that:
        a first identifying annotation is adjacent the first message indicating that the first message regards the first topic,
        a second identifying annotation is adjacent the second message of the conversation indicating that the second message regards the second topic,
        both the first and second identifying annotations are adjacent the third message indicating that the third message regards both the first and second topic, and
        any identifying annotation of the identifying annotations that is adjacent a message that instantiates a topic is graphically distinct compared to other identifying annotations of that topic;
    displaying, in a pop-up window near the GUI window and responsive to a user selecting the first identifying annotation, the first portion and the second portion of the third message adjacent the first message in response to identifying that only the first portion of the third message regards the first topic of the first message such that the second portion is crossed out within the pop-up window; and
    compiling a chart of all topics as discussed in all respective messages and as sent by each of the at least two users within the text conversation.

2. The computer-implemented method of claim 1, wherein the identifying that the first message regards the first topic includes identifying a trait of at least one of the at least two users.

3. The computer-implemented method of claim 1, wherein the identifying that the first message regards the first topic includes identifying the first topic using natural language processing techniques on words of the first message.

4. The computer-implemented method of claim 1, wherein the identifying that the first message regards the first topic includes identifying annotations from the at least two users.

5. The computer-implemented method of claim 1, wherein the first message is in a first chatting application and the third message is in a second chatting application.

6. The computer-implemented method of claim 1, further comprising presenting the chart to one of the at least two users within a graphical user interface.

7. The computer-implemented method of claimed 6, wherein the chart is navigable to respective topics of the chart.

8. The computer-implemented method of claim 1, further comprising:
    receiving a plurality of messages of the text conversation subsequent to the third message that push the third message out of a graphical user interface displaying the plurality of messages, wherein none of the plurality of messages regard the second topic;
    identifying that a fourth message received subsequent to the plurality of message and of the text conversation regards the second topic; and
    displaying the fourth message adjacent the second message within the graphical user interface in response to identifying that the fourth message regards the second topic of the second message.

9. A system comprising:
    a display;
    a processor; and
    a memory in communication with the processor, the memory containing instructions that, when executed by the processor, cause the processor to:
        identify that a first message of a text conversation displayed within a graphical user interface (GUI) window on the display between at least two users regards a first topic;
        identify that a second message received subsequent to the first message and of the text conversation regards a second topic;
        identify that a third message received subsequent to the second message and of the text conversation includes a first portion that regards the first topic and a second portion that regards the second topic;
        cause the display to present respective identifying annotations that are non-textual symbols that indicate respective topics of respective messages adjacent each message of the conversation such that:
            a first identifying annotation is adjacent the first message indicating that the first message regards the first topic, a second identifying annotation is adjacent the second message of the conversation indicating that the second message regards the second topic, both the first and second identifying annotations are adjacent the third message indicating that the third message regards both the first and second topic, and any identifying annotation of the identifying annotations that is adjacent a message that instantiates a topic is graphically distinct compared to other identifying annotations of that topic;

cause the display, in a pop-up window near the GUI window and responsive to a user selecting the first identifying annotation, to present the first portion and the second portion of the third message adjacent the first message in response to identifying that only the first portion of the third message regards the first topic of the first message such that the second portion is crossed out within the pop-up window; and compile a chart of all topics as discussed in all respective messages and as sent by each of the at least two users within the text conversation.

10. The system of claim 9, wherein the identifying that the first message regards the first topic includes at least one of:
identifying a trait of at least one of the at least two users;
identifying the first topic using natural language processing techniques on words of the first message; or
identifying annotations from the at least two users.

11. The system of claim 9, wherein the first message is in a first chatting application and the third message is in a second chatting application.

12. The system of claim 9, the memory further containing instructions that, when executed by the processor, cause the processor to present the chart to one of the at least two users within a graphical user interface.

13. The system of claim 12, wherein the chart is navigable to respective topics of the chart.

14. The system of claim 9, the memory further containing instructions that, when executed by the processor, cause the processor to:
identify that a plurality of messages of the text conversation that are received subsequent to the third message regard topics other than the second topic, wherein the plurality of messages push the third message out of a graphical user interface displaying at least some of the plurality of messages;
identify that a fourth message received subsequent to the plurality of messages and of the text conversation regards the second topic;
cause the display to present the fourth message adjacent the second message within the graphical user interface in response to detecting that the fourth message regards the second topic of the second message.

15. A computer program product, the computer program product comprising a computer readable storage medium having program instructions embodied therewith, the program instructions executable by a computer to cause the computer to:
identify that a first message of a text conversation displayed within a graphical user interface (GUI) window within a display between at least two users regards a first topic;
identify that a second message received subsequent to the first message and of the text conversation regards a second topic;
identify that a third message received subsequent to the second message and of the text conversation includes a first portion that regards the first topic and a second portion that regards the second topic;
cause the display to present respective identifying annotations that are non-textual symbols that indicate respective topics of respective messages adjacent each message of the conversation such that:
a first identifying annotation is adjacent the first message indicating that the first message regards the first topic,
a second identifying annotation is adjacent the second message of the conversation indicating that the second message regards the second topic,
both the first and second identifying annotations are adjacent the third message indicating that the third message regards both the first and second topic, and
any identifying annotation of the identifying annotations that is adjacent a message that instantiates a topic is graphically distinct compared to other identifying annotations of that topic
cause the display to present the first portion and the second portion of the third message adjacent the first message in response to identifying that only the first portion of the third message regards the first topic of the first message such that the second portion is crossed out within the pop-up window; and
compile a chart of all topics as discussed in all respective messages and as sent by each of the at least two users within the text conversation.

16. The computer program product of claim 15, wherein the identifying that the first message regards the first topic includes at least one of:
identifying a trait of at least one of the at least two users;
identifying a discussed concept of the first topic using natural language processing techniques on words of the first message; or
identifying annotations from the at least two users.

17. The computer program product of claim 15, wherein the first message is in a first chatting application and the third message is in a second chatting application.

18. The computer program product of claim 15, the computer readable storage medium further containing instructions that, when executed by the computer, cause the computer to present the chart to one of the at least two users within a graphical user interface.

* * * * *